US006640213B1

(12) United States Patent
Carp et al.

(10) Patent No.: US 6,640,213 B1
(45) Date of Patent: Oct. 28, 2003

(54) AUTOMATED PROCESS FOR CONDUCTING JURY VOIR DIRE

(76) Inventors: Tenley Anne Carp, 1737 P St., NW., Apt. 401, Washington, DC (US) 20036; Milton B. Friedman, 8416 Tuckerman La., Potomac, MD (US) 20854; Natalya B. Davidov, 8416 Tuckerman La., Potomac, MD (US) 20854

( * ) Notice: Subject to any disclaimer, the term of this patent is extended or adjusted under 35 U.S.C. 154(b) by 0 days.

(21) Appl. No.: 09/459,351

(22) Filed: Dec. 13, 1999

(51) Int. Cl.[7] .............................................. G06F 17/60
(52) U.S. Cl. .................................. 705/10; 705/8; 705/9
(58) Field of Search ...................... 705/10, 9, 8

(56) References Cited

U.S. PATENT DOCUMENTS 5,895,450 A * 4/1999 Sloo ........................... 345/751
5,899,981 A * 5/1999 Taylor et al. ................. 705/20
6,088,451 A * 7/2000 He et al. ..................... 380/255

FOREIGN PATENT DOCUMENTS

JP 2002024255 * 2/2002 ............ G06F/17/30

OTHER PUBLICATIONS

"Jury Plan", Western District of Louisiana, May 5, 1998 [retrieved Jan. 10, 2003], 9 pages, retrieved from: Google.com.*
"Jury Selection Plan", Eastern District of New York, May 18, 1999 [retrieved Jan. 10, 2003], 8 pages, retrieved from: Google.com.*
"Court Technology Bulletin", National Center for State Courts, Mar./Apr. 1991 [retrieved Jul. 23, 2002], vol. 3, No. 2, 10 pages, retrieved from: Google.com.*
Domino, John C., "Effectiveness of Computer Technology in Jury Selection and Mangement: The impact of one automated system", www.judicalsystems.com, 1998 [retrieved Jul. 3, 2002,], 5 pages, retrieved from: Google.com.*
Cohen, Janet, "Thirs Wave Inundates Bradford", Viewpoint, May/Jun. 1985 [retrieved Aug. 15, 2002 ], vol. 13, No. 3, 1 page, retrieved from: Dialog.*
"Tyler Corporation Subsidiary Awarded $5.5 Million in Contracts to Install System", PR Newswire, Jul. 8, 1998 [retrieved Jul. 23, 2002], 2 pages, retrieved from Proquest Direct.*
State of Connecticut Jury Duty FAQ, [retrieved on Apr. 18, 2002], http://www.jud.state.ct.us/faq/jury.html, 10 pages.*
Juror's Handbook, 1996 [retrieved on Apr. 18, 2002], http://www.courtguide.com/juryduty.html, 18 pages.*
ACS Government Systems, [retrieved on Apr. 12, 2002], http://www.ncsc.dni.us/NCSC/vendor/vendor98/ACS.HTM, 3 pages.*
Munsterman, G. Thomas, "Cyberjuror", 1995 [retrived on Apr. 15, 2002], http://www.ncsc.dni.us/research/jurors/jurynews/cyberj.htm, 4 pages.*
Judicial Systems, Inc., "Jury2000 Plus", 1997 [retrieved on Apr. 16, 2002], http://www.judicialsystems.com, 13 pages.*
United States District Court Northern District of Texas, "Jury Plan", 1998 [retrieved on Apr. 19, 2002], http://www.txnd.uscourts.gov/PDFs/miscord5.pdf, 19 pages.*

(List continued on next page.)

Primary Examiner—Tariq R. Hafiz
Assistant Examiner—Beth Van Doren

(57) ABSTRACT

An automated system and process for conducting jury voir dire comprising an automated juror qualification test and assignment of report date and summons issuance, an automated process for requesting, reviewing and approving/rejecting requests for exemption from jury service and requests for deferral of the report date, and an automated juror suitability test.

11 Claims, 7 Drawing Sheets

OTHER PUBLICATIONS

Harris County District Clerk Online, "Screenshots 1–18", 1999 [retrieved Apr. 18, 2002], http://www.hcdistrickclerk.com, 18 pages.*

Landis, Tim, "Jury selection becoming easier, fairer/New Computer System increases the number of potential Jurors", State Journal Register, 1996 [retrieved Apr. 18, 2002], 2 pages, Retrieved from: Proquest Online.*

"Software Systems, Inc.", IBM, Feb. 8, 1998 [retrieved Jul. 30, 2002], retrieved from: http://wwwsoftwaresystems.com/jurysel.html.*

Chambers, Aaron, "Better jury selection through technology is court's hope", Chicago Daily Law Bulletin, Jun. 19, 1999 [retrieved on Aug. 1, 2002], 2 pages, Retrieved from: Lexis Nexus.*

"Jury Duty Rescheduling Now Accepted By Computer", Harris County District Clerk Current News Page, 08/23/199 [retrieved on Aug. 13, 2002], 5 pages, Retrieved from: http://www.hccountydistrinctclerk.com via Google.com.*

The Northern District of Texas Jury Plan, "United States District Court, Northern District of Texas Jury Plan", 1998 [retrieved on Apr. 13, 2002], 19 pages, Retrieved from: http://www.txnd.uscourts.gov/PDFs/miscord5.pdf.*

Judicial Systems Incorporated, "Judicial Administration System Jury Software", www.judicialsystems.com, Jan. 27, 1998 [retrieved on Aug. 16, 2002], 19 pages, Retrieved from: www.archive.org.*

Gilliam et al., "Getting the Truth from Prospective Jurors (With Form)", The Practical Litigator, Jul. 1992 [retrieved on Aug. 16, 2002], vol. 3, Issue 4, 7 pages.*

"Jury Focus", News and Information from Jury Solutions, May 1998 [retrieved Aug. 18, 2002], 3 pages, Retrieved from: http://www.jurysolutions.com.*

Munsterman, G. Thomas, "Cyberjuror", NCSC Jury News, Fall 1995 [retrieved Apr. 19, 2002], 4 pages, Retrieved from: http://www.nscs.dni.us/.*

Landis, Tim, "Jury Selection becoming easier, faster", State Journal Register, Jun. 9, 1996 [retrieved on Apr. 19, 2002], 2 pages, Retrieved from: Proquest Direct.*

White, Vicki, "L.A. County Jury System Lets Jurors Do the Dialing", FCW.com, May 11, 1998 [retrieved on Jul. 30, 2002], 3 pages, Retrieved from: http://www.fcw.com.*

ACS Juror Management System, "ACS Government Systems/Vendor", NCSC, 1998 [retrieved on Aug. 18, 2002], 3 pages, Retrieved from: http://www.hcsc.dni.us/NCSC/vendor/vendor98/ACS.HTM.*

"Administrative Office of the United States Courts Selects SCT for the Implementation of a Jury Management System", PR Newswire, Feb. 26, 1998 [retrieved on Jul. 2, 2002], 2 pages, Retrieved from: Proquest Direct.*

Wyatt et al., "An Automated Jury Selection System", Proceedings of the 5$^{th}$ Hawaii International Conference on System Science, Jan. 1972 [retrieved on Aug. 15, 2002], 1 page, Retrieved from: Dialog.*

"County of Santa Barbara, California signs contract with Atek", Ameritrust, Jan. 9, 1990 [retrieved on Aug. 15, 2002], 2 pages, Retrieved from: Dialog.*

Administrative Office of the United States Courts Selects SCT For the Implementation of a Jury Management System <http://www.dialogclassic.com.main.vmgw> printed Jan. 11, 2001.

Selection System Speeds Up Wheels Of Justice <http://www.dialogclassic.com.main.vmgw> printed Jan. 11, 2001.

PCT–International Search Report.

Modified Plan For the United States District Court for the District of Columbia For the Random Selection of Grand and Petit Jurors (As Amended Through Aug. 1, 1999).

Jury Plan for the Superior Court of the District of Columbia.

* cited by examiner

| | | YES | NO |
|---|---|---|---|
| | Answer "YES" or "NO" to the following questions: | | |
| 1. | Are you a United States citizen? | ☐ | ☐ |
| 2. | Are you 18 years of age or older? | ☐ | ☐ |
| 3. | Do you speak, read and write English fluently? | ☐ | ☐ |
| 4. | Have you ever been convicted of treason or a felony? | ☐ | ☐ |
| 5. | If you have been convicted, have you had your civil rights restored? | ☐ | ☐ |
| 6. | Have you been a resident of Maryland for the past 12 months? | ☐ | ☐ |
| 7. | Are you unable to serve as a juror due to mental impairment? | ☐ | ☐ |
| 8. | Have you reported as a juror in a court within the last 2 years? | ☐ | ☐ |
| | I HEREBY CERTIFY UNDER PENALTY OF PERJURY THE ABOVE INFORMATION IS TRUE AND CORRECT | ☐ | |

AUTOMATED PROCESS FOR CONDUCTING JURY VOIR DIRE

BACKGROUND OF THE INVENTION

The United States Constitution guarantees citizens the right to trial by an impartial jury in all criminal prosecutions and in certain civil suits. See U.S. Constitution, Amendments VI and VII. The process used by trial courts to select jurors is called "voir dire." The term "voir dire" is French and literally means "to speak the truth." The voir dire process is used to determine whether particular persons are "qualified" to sit as jurors, whether such persons' schedules enable them to sit as jurors and then whether or not they are "suitable" to sit as a juror on a particular case.

The first hurdle which must be cleared in the juror voir dire process is to determine whether a person is "qualified" to sit as a juror. In order to be "qualified" to sit as a juror, a person must meet certain minimal criteria, such as being 18 years of age or older and a U.S. citizen.

The next step in the juror voir dire process is to determine whether or not a person's schedule renders him/her available to sit as a juror at a particular time when a trial is scheduled. And, finally, the jury voir dire process seeks to determine whether or not a particular person is "suitable" to sit as a juror with respect to the subject matter at issue in a particular trial. This inquiry seeks to determine whether the prospective juror is unbiased and is able to be impartial (for example, a person who was previously convicted on a burglary charge would most likely not be able to be impartial if serving as a juror in another burglary trial).

There are approximately 5,000 trial courts in the United States including courts under the jurisdiction of the states and courts in the federal judicial system. Each such trial court maintains its own rules and procedures with respect to the qualification and selection of prospective trial jurors and the conduct of the jury voir dire process.

A typical juror qualification and selection process is found in Title 28 of the United States Code which deals with federal judicial procedure. Pursuant to that statute, the first step in the federal court juror voir dire process is for the court to compile a master listing of names of prospective jurors from the citizens residing within the court's jurisdiction. There are several general sources used by many courts to compile this master listing, including a list of registered voters and listings of persons filing tax returns, among other sources. See, e.g., 28 U.S.C. §§1861, 1863.

From the master listing of all prospective jurors, the court must devise a procedure whereby a random smaller selection of potential jurors may be made from the master listing. The random smaller selection procedure should be designed to ensure that such random smaller selection procedure results in a fair demographic cross section of the citizens residing within the jurisdiction of the court. See id. The random smaller selection procedure is typically used to form a "master jury wheel" which is periodically emptied and re-filled with another random smaller selection of prospective jurors from the master listing. Id.

The next step in a typical juror voir dire process involves the court's random selection of names of prospective jurors from the master jury wheel at times when persons are needed for jury service in upcoming trials. Each court uses its own rules for determining the number of names to be drawn from the master jury wheel. See, e.g., 28 U.S.C. §1864.

Once names of prospective jurors are drawn from the master jury wheel, the court must mail to every person whose name is drawn from the master jury wheel a juror questionnaire form for each prospective juror to fill out and return. See id. This juror questionnaire form seeks to determine whether such prospective juror is "qualified" to sit as a juror.

Following receipt of the completed juror questionnaire form, the court must determine whether a person completing such juror questionnaire form is qualified or unqualified for jury service. The persons who remain following such determination are then placed in a "qualified jury wheel." From time to time, the court conducts a random drawing of such number of names of persons from the qualified jury wheel as may be required for assignment to jury panels for upcoming trials. Following the random drawing, the court then issues summonses to each person whose name was drawn from the qualified jury wheel for jury service. See, e.g., 28 U.S.C §§1865, 1866. Typical means used for service of such summonses include service by registered, certified or first-class mail. See id.

Following receipt of a summons by a person whose name was drawn from the qualified jury wheel for jury duty, such person may still be excused or excluded from service as a juror or have his/her jury service deferred. A selected person may be excused from jury service or obtain a deferral of his/her jury service at a particular time, for example, upon a showing that jury service would cause him/her undue hardship or extreme inconvenience. (Many courts will, however, reinsert the excused person into the qualified jury wheel.) Finally, if a prospective juror makes it to this step in the jury voir dire process, he/she may still be excluded from jury service upon a showing that such prospective juror would not be able to render impartial jury service in a particular trial. Such excluded prospective juror could also be reinserted into the qualified jury wheel if the basis for the initial exclusion would not be relevant to his/her ability to serve on another jury. See id.

As can be determined from the above description, the typical juror voir dire processes currently used by various trial courts are quite cumbersome, inefficient, document intensive and costly. For example, typically each trial court pays costs associated with the printing and duplication of juror questionnaires, summonses, maps, instructions for jury service, fact books on jury service, and preprinted envelopes, among other documents. The courts also have postage costs associated with mailing the juror questionnaire forms to prospective jurors, postage for prepaid return envelopes for the prospective jurors' use to return the completed juror questionnaire forms, postage for mailing notifications to prospective jurors who were determined to be unqualified for jury service, postage for mailing jury summonses to prospective jurors who were determined to be qualified and were then drawn from the qualified juror wheel, postage for prepaid return envelopes for each qualified prospective juror's use to return a second juror questionnaire, postage for mailing letters to prospective jurors informing them of the dates upon which they must report to court, postage for prepaid return envelopes for prospective jurors' use to request an exemption from, exclusion from or deferral of their jury service, and postage for mailing a notice to a prospective juror of the court's determination with respect to the juror's request for a deferral, exemption or exclusion. All of these postage costs mount quite rapidly. It is estimated that a single court can spend as much as $2.30 per person on postage costs alone with regard to the juror voir dire process. And, assuming that this court mails out approximately 75,000 initial juror questionnaires in a two-year period, it may spend as much as $172,500.00 in postage costs associated with the juror voir dire process in any two-year period.

In addition to these printing and postage costs, a trial court will also incur costs associated with personnel who administer the juror voir dire process and for each judge's time for participation in the jury voir dire process. If the jury voir dire processes were managed more efficiently, courts could save much of these costs and/or reassign or reallocate administrative resources to other matters.

Accordingly, a need exists for a method and system for conducting jury voir dire which is efficient, utilizes less paper and is less costly than current processes.

SUMMARY OF THE INVENTION

It is therefore an object of the present invention to provide a system and method for conducting jury voir dire which is efficient, reduces paperwork and is less costly than current jury voir dire processes used by trial courts.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, this invention includes, in one aspect, an automated process for conducting jury voir dire for a trial court comprising the steps of: forming a master database of names of citizens eligible to serve as jurors from a set of all citizens residing within the trial court's jurisdiction, the master database being stored in a computer system of the trial court; forming a master jury wheel from the master database by using a random selection procedure to select a smaller set of names of citizens, the smaller set of names of citizens representative of a fair demographic cross section of the set of all citizens residing within the trial court's jurisdiction, the master jury wheel being stored in the computer system of the trial court; randomly selecting a plurality of prospective jurors from the plurality of names of citizens from the master jury wheel and storing data in a database for a jury voir dire system relating to a name, a social security number, a first juror identification number and a court identification number for each one of the plurality of prospective jurors; transmitting an initial notification of a potential jury service to each one of the plurality of prospective jurors; wherein for each one of said plurality of prospective jurors the initial notification includes the first juror identification number, the court identification number and a predetermined URL address identifying a location of a host server for accessing a jury voir dire system via a browser of a computer used by one of the plurality of prospective jurors; transmitting a first access request, the first juror identification number, the court identification number and a social security number for the one prospective juror from the computer of the one prospective juror over a general purpose computer network to the host server; comparing a first pair of numbers including the transmitted first juror identification number to the stored first juror identification number for the one prospective juror in the second database to determine whether the transmitted first juror identification number matches the stored first juror identification number and comparing a second pair of numbers including the transmitted social security number to the stored social security number for the one prospective juror in the second database to determine whether the transmitted social security number matches the stored social security number; granting access to a secure portion of the jury voir dire system if the first pair of numbers is a match and the second pair of numbers is a match; serving a web page to the computer for the one prospective juror representing a juror questionnaire form, the juror questionnaire form having a plurality of questions designed to determine whether the one prospective juror is qualified to sit as a juror; completing the juror questionnaire by responding to each of the plurality of questions and transmitting the completed juror questionnaire form from the computer of said prospective juror over the general purpose computer network to the host server; comparing the responses for each of the plurality of questions on the transmitted, completed juror questionnaire form to a stored standard set of responses for each of the plurality of questions, the stored standard set of responses representative of responses for a qualified juror; updating the data stored in the first database and the second database relating to each one of the prospective jurors indicating whether the one of the prospective jurors is qualified based on the results of the comparing step; transmitting a summons for jury service to each one of the plurality of prospective jurors that is qualified, the summons including an assigned report date for the qualified prospective juror to report to the trial court for jury service; querying the qualified prospective juror, in response to an inputted second access request and the first juror identification number from the computer of the qualified prospective juror over the general purpose computer network to the host server, whether the qualified prospective juror will accept the assigned report date, request a deferral of the assigned report date or request on exemption from the jury service; serving a Request for Deferral form to the computer of the qualified prospective juror from the host server over the general purpose computer network in response to a request for deferral response to the query from the qualified prospective juror or serving a Request for Exemption form to the computer of the qualified prospective juror from the host server over the general purpose computer network in response to a request for exemption response to the query from the qualified prospective juror; completing and transmitting the completed Request for Deferral form from the computer of the qualified prospective juror over the general purpose computer network to the host server in response to a served Request for Deferral form, the completed, transmitted Request for Deferral form including a reason given by the qualified prospective juror for requesting the deferral of the report date; completing and transmitting the completed Request for Exemption form from the computer of the qualified prospective juror over the general purpose computer network to the host server in response to a served Request for Exemption form, the completed, transmitted Request for Exemption form including a reason given by the qualified prospective juror for requesting the exemption from jury service; comparing the completed, transmitted Request for Deferral form and the given reason for requesting the deferral to a plurality of predetermined acceptable reasons for deferral of the report date and, if the given reason matches with one of the plurality of predetermined acceptable reasons, transmitting a first approval notification to the computer of the qualified prospective juror over the general purpose computer network from the host server, the first approval notification informing the qualified prospective juror that the request for deferral was approved and that a new report date will be assigned; comparing the completed, transmitted Request for Exemption form and the given reason for requesting the exemption to a plurality of predetermined acceptable reasons for exemption from jury service and, if the given reason matches with one of the plurality of acceptable reasons for exemption, transmitting a second approval notification to the computer of the qualified prospective juror over the general purpose computer network from the host server, the second approval notification informing the qualified prospective juror that the request for exemption was approved and that the qualified prospective juror is exempted from jury service; updating the data stored in the first database and the second database relating to each one of the qualified prospective jurors with data indicative of the response of the one qualified prospective juror to the query of the querying step and with data indicative of whether a request for deferral or a request for exemption was approved; transmitting a second assigned report date from the host server to the computer of the qualified prospective juror over the general purpose computer network if a request for deferral was approved for the qualified prospective juror; transmitting on the report date a second access request and the first juror identification number and the social security number for the qualified prospective juror from the computer of the qualified prospective juror over the general purpose computer network to the host server; repeating the comparing step and the granting access steps; outputting, in response to the second access request following the granting access step, to the computer of the qualified prospective juror a second juror identification number for the qualified prospective juror; updating the data stored in the first database and the second database relating to the qualified prospective juror indicating that the qualified prospective juror reported to the court on the assigned report date; serving a Juror Suitability Test form to the computer of the qualified prospective juror from the host server over the general purpose computer network, the Juror Suitability Test form including a plurality of questions designed to determine at least one of a plurality of trial types for which the qualified prospective juror is suitable to sit as a juror; completing the Juror Suitability Test form by responding to each of the plurality of questions and transmitting the completed Juror Suitability Test form from the computer of the qualified prospective juror to the host server over the general purpose computer network; and comparing the responses for each of the plurality of questions on said transmitted, completed Juror Suitability Test form to a stored standard set of responses for each of the plurality of questions and assigning a group category to the qualified prospective juror, the assigned group category indicative of at least one of a plurality of trial types for which the qualified prospective juror is suitable to sit as a juror.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 3 is an illustrative screen display illustrating a step of the automated process in accordance with the present invention.

DETAILED DESCRIPTION OF THE PREFERRED EMBODIMENT

Figure 1A:
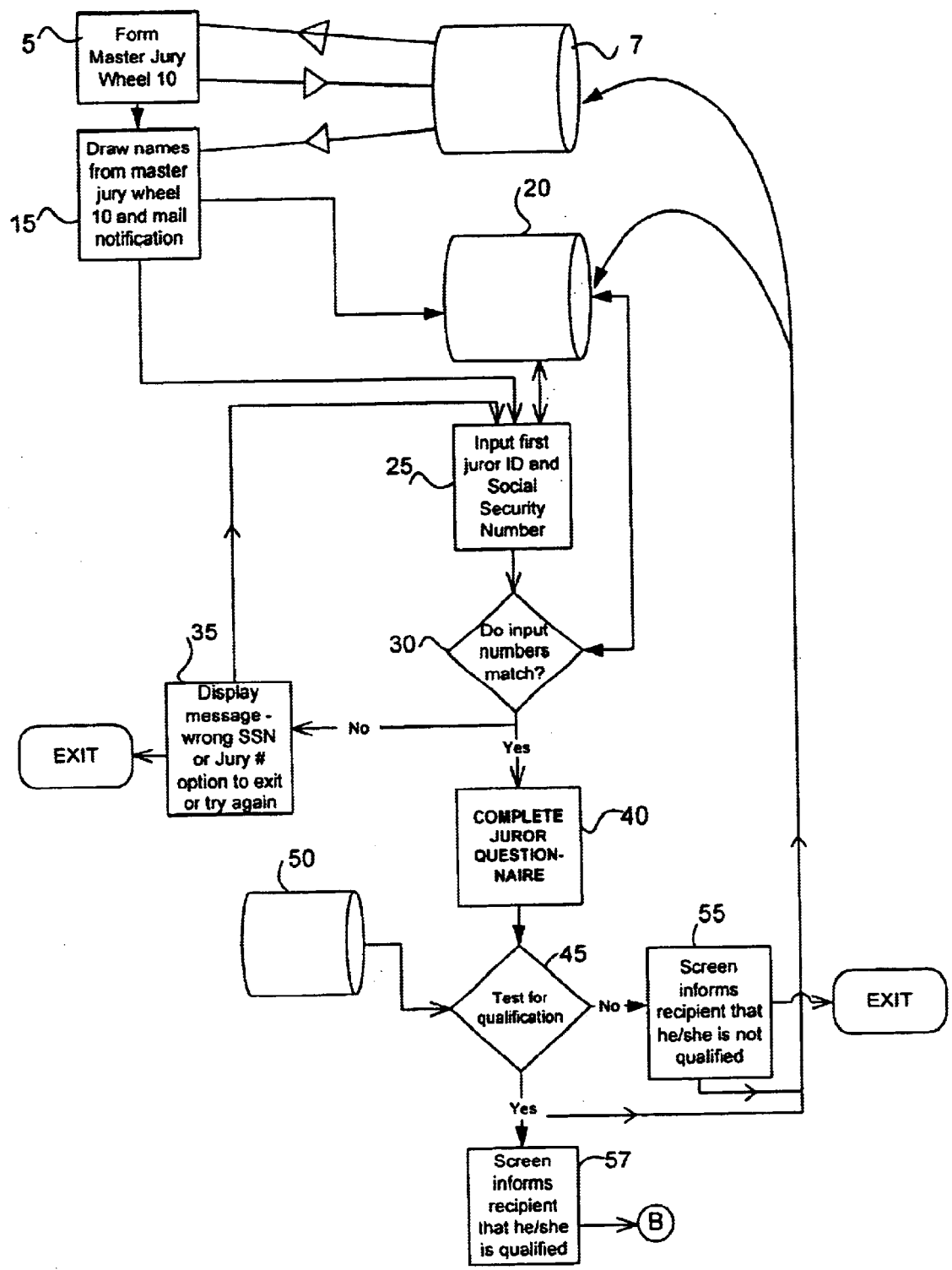
FIGS. 1A–1C are a flowchart illustrating the steps in the automated process for conducting jury voir dire in accordance with the present invention.

Reference will now be made in detail to the present preferred embodiment of the invention, an example of which is illustrated in the accompanying drawings in which like reference characters refer to corresponding elements.

Figure 1B:
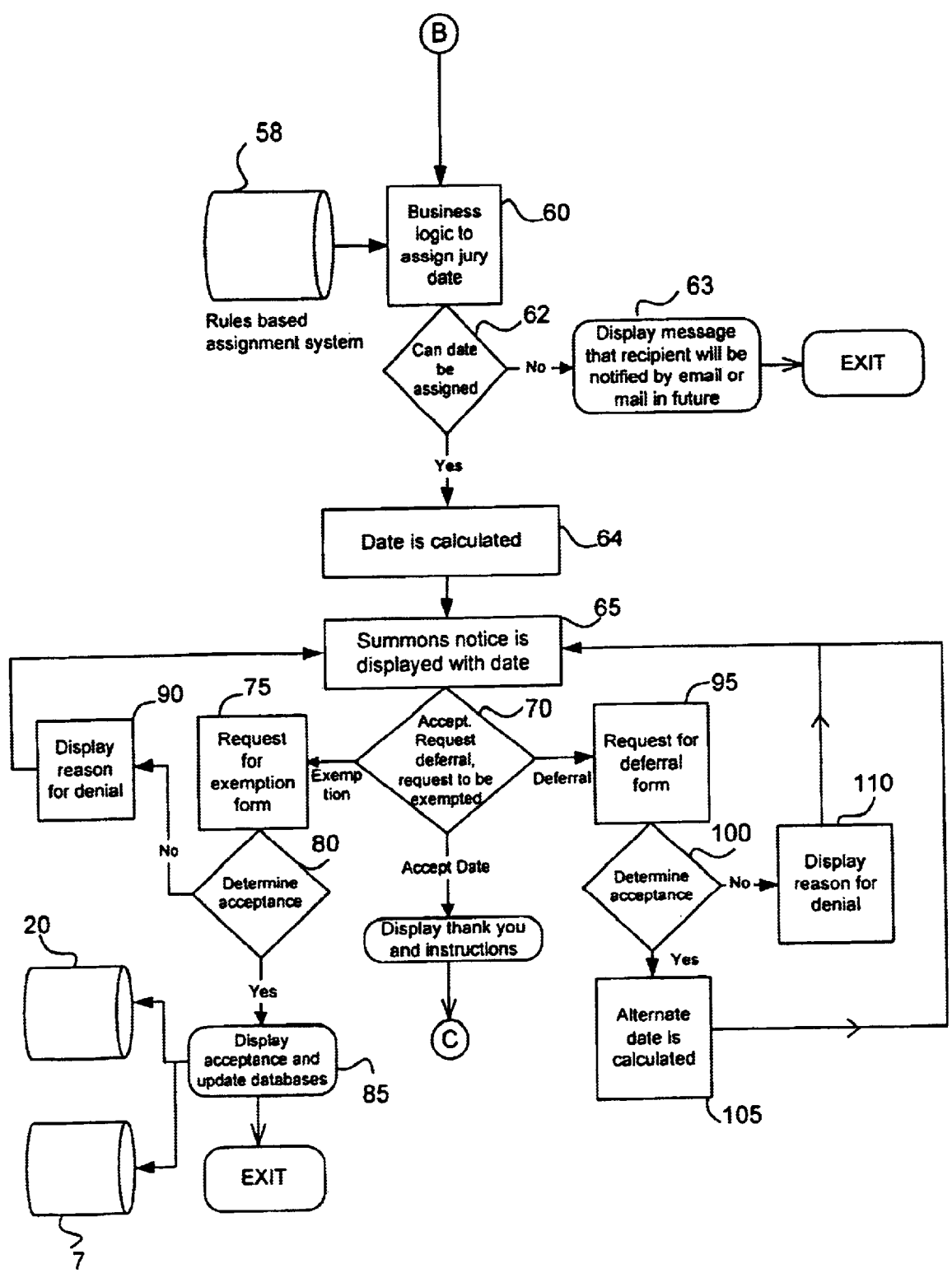
Figure 1C:
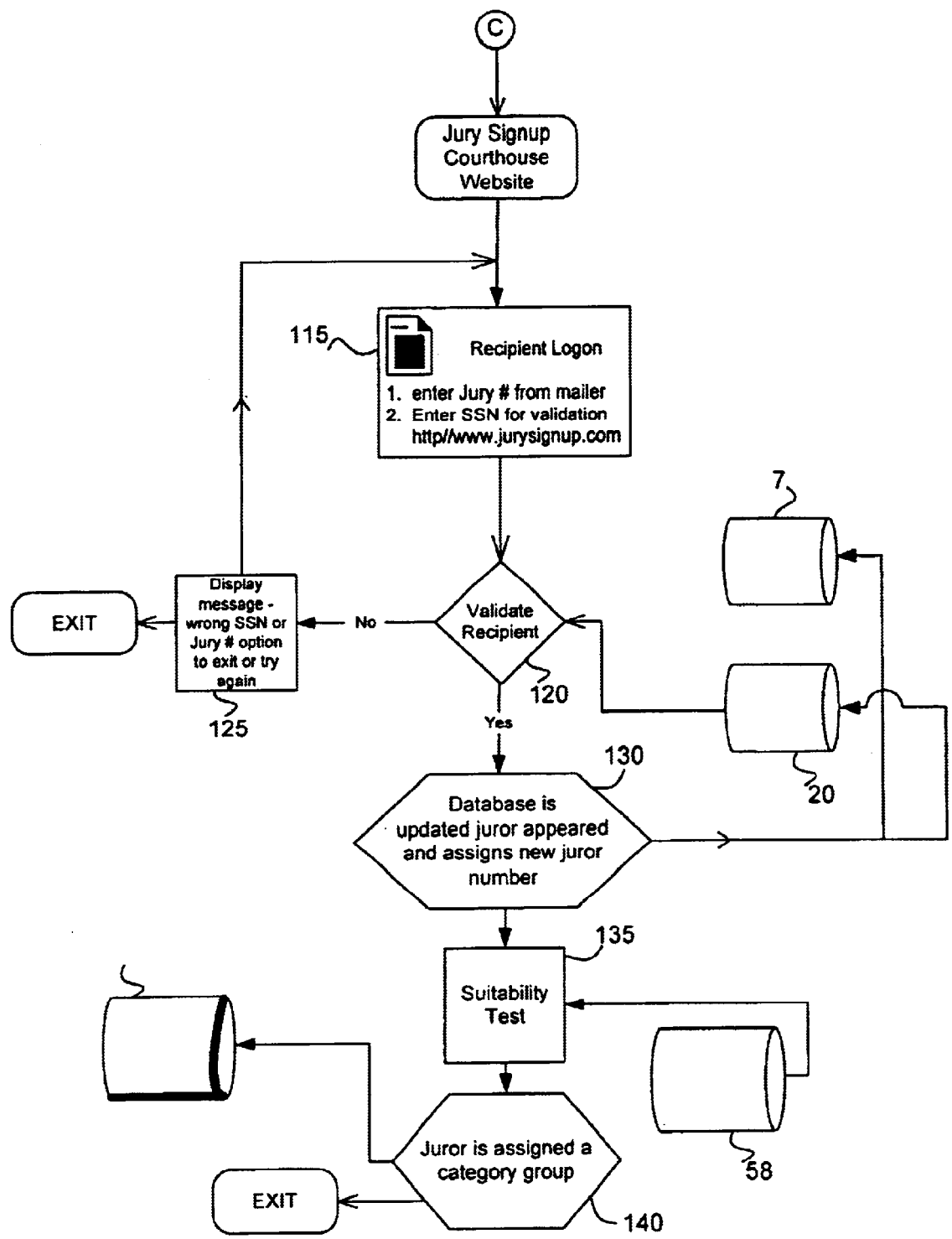

FIGS. 1A–1C illustrate an automated system and method for conducting jury voir dire in accordance with the present invention.

The system and method for conducting jury voir dire of the present invention makes use of a court's existing master listing or database 7 of names of citizens eligible to serve as jurors from a set of all citizens within the court's jurisdiction. As described above, there are various sources used by a court to compile the master database including listings of registered voters, listings of persons holding driver's licenses, and listings of persons filing tax returns, among other sources. From the master database 7, at step 5, the court will form a master jury wheel 10 by using a random selection procedure to select a smaller set of names of citizens wherein the smaller set of names of citizens is representative of a fair demographic cross section of the set of all citizens residing within the court's jurisdiction. The master jury wheel 10 is preferably stored in a database within a memory of the court's computer system. At step 15, the court will use its standard random-selection procedure for the selection of a plurality of prospective jurors from the names of citizens in the master jury wheel 10 for service as jurors for trials. Then the court will mail an initial postcard notification to each of a plurality of prospective jurors whose names were drawn from the master jury wheel 10 notifying each of the plurality of prospective jurors that his/her name was drawn for a potential jury service. Concurrently with the mailing of the initial postcard notification to each prospective juror, the court's computer system will transmit data corresponding to a listing of names of each prospective juror whose name was drawn from the master jury wheel 10 and to whom the court mailed the initial postcard notification along with a first juror identification number, a court identification number and a social security number for each such prospective juror. This data transmission can be conducted via a document in extensible markup language format (XML), or other suitable format, sent over the Internet to a database server for system 1000. System 1000 will save the transmitted data from the court's computer system in a second database 20 of system 1000 for use by system 1000 in implementation of the process of the present invention.

The initial postcard notification sent to each prospective juror in step 15 will include a Uniform Resource Locator (URL) address for a host server of an Internet World Wide Web site for accessing the automated system 1000 of the present invention. The initial postcard notification sent to each prospective juror will also include a street address for a location, such as a public library or school, in close proximity to the prospective juror's residence address, where the prospective juror may obtain computer access to the Internet and thereby to system 1000 in the event the prospective juror does not have a computer for Internet access from his/her residence or business. The initial postcard notification sent to each prospective juror will also include a toll free telephone number for the prospective juror to use to access system 1000 in the event the prospective juror wishes to access the automated system 1000 telephonically rather than via computerized Internet access. The initial postcard notification will further include the first juror identification number and the court identification number for the prospective juror's use in accessing the automated system 1000. Each of the prospective jurors will be assigned a unique first juror identification number. The first juror identification number serves to identify persons authorized to access certain portions of system 1000 as discussed in greater detail below. The court identification number serves to identify the specific court to which the prospective juror would be required to report in the event the prospective juror is summoned for jury service.

Figure 2A:
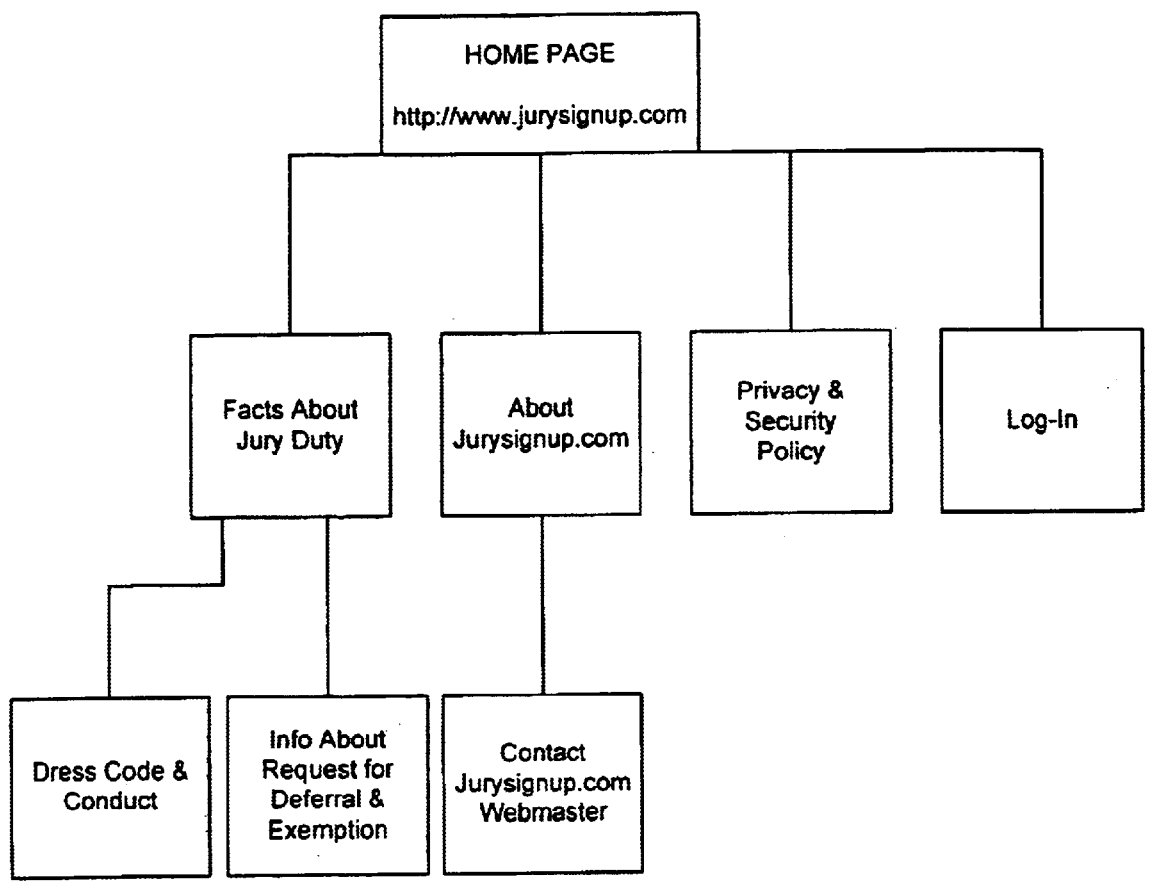
FIGS. 2A–2C are block diagrams illustrating various features for an Internet World Wide Web site for accessing the automated system and method of the present invention.

The prospective juror will then input the URL into his/her browser and the host server of system 1000 will serve a web page for accessing system 1000. As shown in FIG. 2A, there are several buttons on the web site home page which, when the prospective juror clicks his/her mouse on one such button, in response thereto, the system 1000 server will serve web pages containing information on one of a plurality of general topics concerning jury service to the prospective juror's computer. Such general topics may include facts about jury duty (e.g., explaining a citizen's right to a jury trial and a citizen's obligation to serve as a juror), dress code and conduct of a juror and explanation of means to use to request a deferral or exemption from jury service. There is also a button for the prospective juror to click on to log into a secured portion of system 1000. This is represented in FIG. 2A by the button labeled "Log In."

Next, at step 25 of FIG. 1A, the prospective juror will be required to input his/her first juror identification number, the court identification number and his/her social security number as security passwords for access into the secured portion of system 1000. The system 1000 will make use of encryption pursuant to the secure socket layer (SSL) 128-bit protocol widely used in connection with Internet web sites for the secure portion of the system 1000 web site to prevent access to the secure portion by an unauthorized user and to protect the privacy interests of each prospective juror accessing using system 1000. SSL 128-bit encryption has been accepted by the Federal government and should be acceptable to most of the trial courts nationwide.

At step 30, system 1000 assesses whether the prospective juror correctly input his/her first juror identification number and social security number by comparing the input first juror identification number to the first juror identification number stored in database 20 and the input social security number with the social security number stored in database 20 for such prospective juror to determine whether each of the two compared pairs of numbers are matches. If one or both compared pairs of numbers do not match, then, at step 35, the system 1000 displays an error message to the prospective juror informing the prospective juror that the prospective juror input one of the first juror identification number or the social security number, or both, incorrectly, and will prompt the prospective juror to either exit system 1000 or re-input the incorrectly input number(s) by going back to step 25.

Figure 2B:
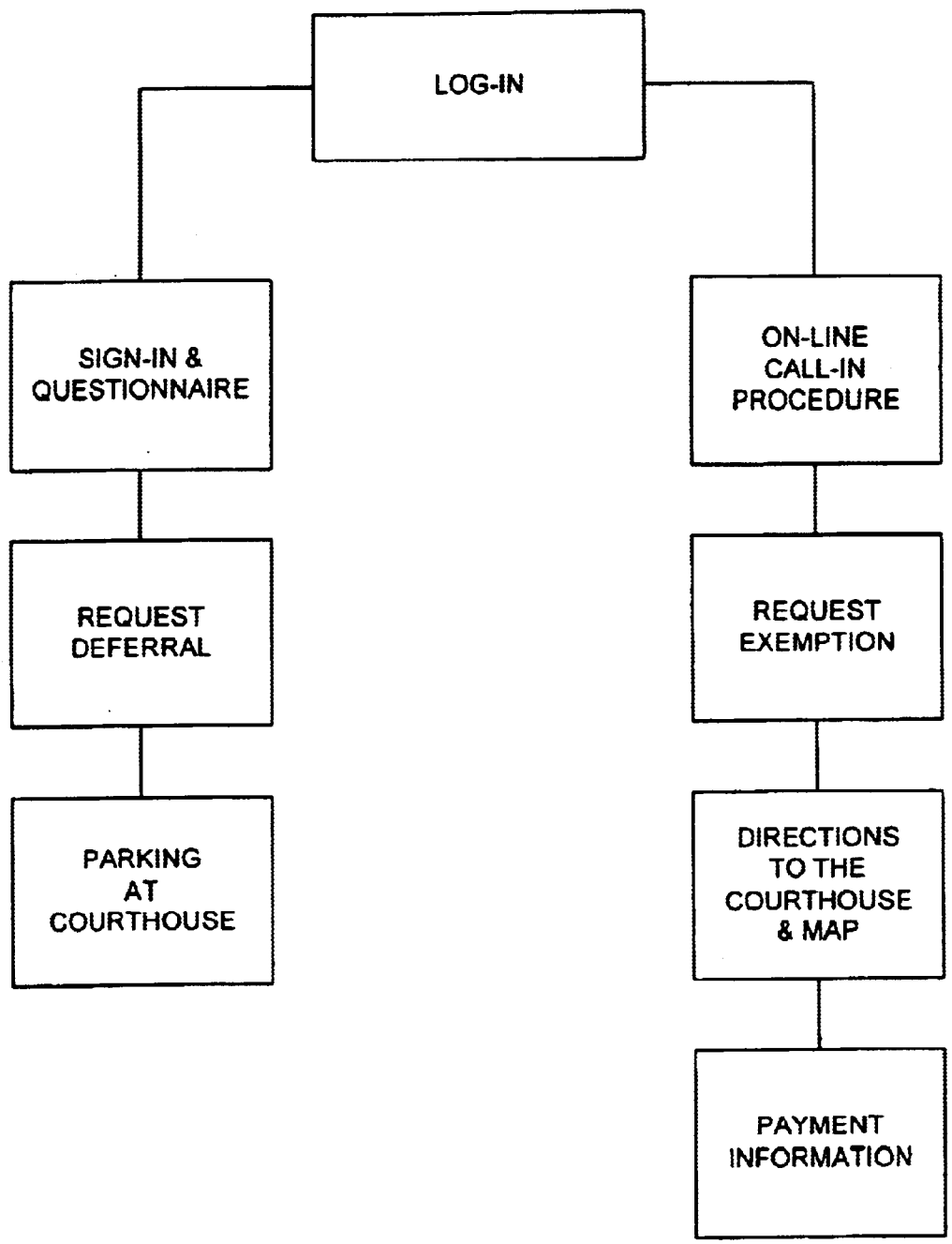
Figure 2C:
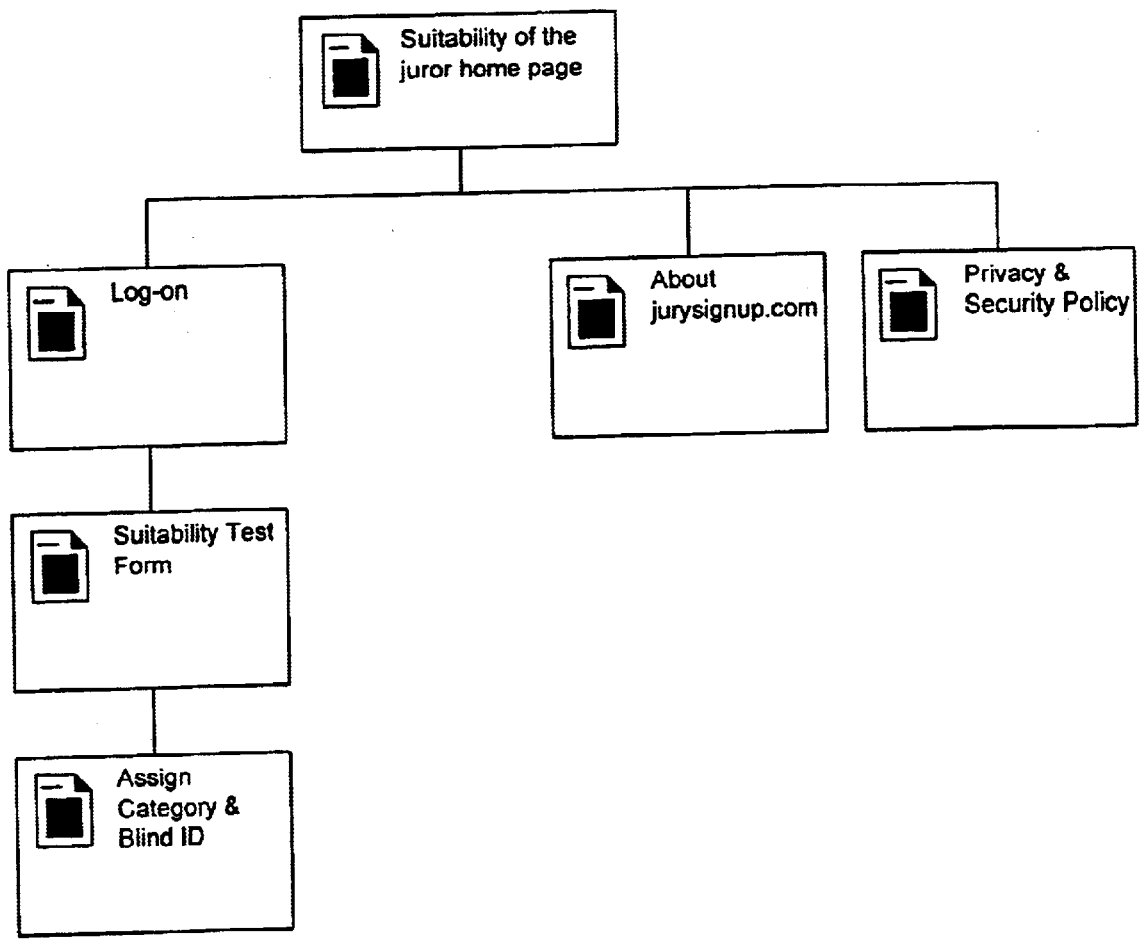

After the prospective juror has successfully completed the log-in steps 25 and 30, then, at step 40, the prospective juror gains access to the secure portion of the web site for system 1000 and is shown a home page screen display similar to that of FIG. 2B. The host server of system 1000 will serve web pages to the prospective juror's computer which are specific to the trial court identified by the court identification number. As shown in FIG. 2B, the prospective juror may click on buttons for a juror questionnaire which is tailored for the specific trial court, a Request for Deferral form or a Request for Exemption form for the specific trial court, directions and a map to the specific trial court, etc.

The prospective juror's initial postcard notification, sent to the prospective juror in step 15 as explained above, will inform the prospective juror that such prospective juror must click on the button for the Juror Questionnaire form. The system 1000 host server will serve a web page similar to that shown in FIG. 3 which illustrates an example Juror Questionnaire form. This Juror Questionnaire form will include a list of questions to which the prospective juror should indicate a "yes" or "no" answer. (If the prospective juror has accessed system 1000 via a telephonic connection, the prospective juror will instead receive the questions via an audio communication and can input "yes" or "no" responses via touch tone buttons on the telephone.) The prospective juror will complete the Juror Questionnaire form on-line or on the telephone and will transmit the completed Juror Questionnaire form over the Internet back to the system 1000 server.

Following receipt of the transmitted, completed Juror Questionnaire form by system 1000, in step 45, the answers of the prospective juror contained in the transmitted, completed Juror Questionnaire form are compared to a set of correct answers for jury qualification which are previously stored in a process control database 50 of system 1000 to determine whether or not the prospective juror is qualified for jury service. For example, the prospective juror must have responded "Yes" to the first question on the Juror Questionnaire form of FIG. 3 which asked whether the prospective juror was a U.S. citizen. If the prospective juror negatively responds to this question, then such prospective juror is not qualified to serve as a juror. The correct answer for question number 2 on the Juror Questionnaire form of FIG. 3 which asks whether the potential juror is 18 years of age or older is "Yes." Again, if the prospective juror negatively responds to this question, then the prospective juror is not qualified to serve as a juror. The correct answer to the third question on the Juror Questionnaire form of FIG. 3 which asks whether the prospective juror speaks, reads and writes English is "Yes." A prospective juror is not "qualified" to serve as a juror if he is a convicted felon (the information sought in question 4 of the form in FIG. 3). A prospective juror may not be mentally impaired, which is the information elicited in question 7 of the form of FIG. 3. Various jurisdictions have other requirements for juror qualification which are specific to the jurisdiction. The Juror Questionnaire form of system 1000 can therefore be tailored for the specific needs of each trial court. Based upon the prospective juror's input of the first juror identification, the court identification and social security numbers, the server of system 1000 will serve to the prospective juror's computer the appropriate Juror Questionnaire form associated with the specific trial court for which the prospective juror may be summoned for jury service.

If the prospective juror has provided a response to any question on the Juror Questionnaire form which indicates that he/she is unqualified to serve as a juror then, in step 55, the server of system 1000 will serve a web page to the prospective juror's computer informing the prospective juror that he/she is not qualified to serve as a juror and informing the prospective juror that he/she may exit system 1000. This step 55 will conclude the process with respect to such prospective juror. Information regarding the prospective juror's status (i.e., unqualified) will be transmitted to database 20 to update database 20's data with respect to such prospective juror. System 1000 will also transmit the updated data regarding such prospective juror to the court's master jury wheel 10 so that the unqualified prospective juror may be deleted from the master jury wheel 10.

If the prospective juror's responses to the Juror Questionnaire form indicate, on the other hand, that the prospective juror is qualified to serve as a juror, the prospective juror receives an electronic notification in step 57 informing the prospective juror that he/she is qualified for jury service. Then the process continues to step 60 (shown in FIG. 1B).

In step 60, system 1000 retrieves data concerning dates for court sessions (report dates) and numbers of jurors needed for each report date from database 58 and, at step 62, system 1000 processes the retrieved data and seeks to determine whether the qualified prospective juror may be assigned to one of such report dates. The rules for assignment of a report date vary according to the specific trial court. In general, a trial court starts with a calendar having seven days in each week. There is no court session typically held on either Saturday or Sunday of a particular week. Therefore, the Saturdays and Sundays on the calendar may be stricken from a listing of potentially assignable report dates. Then, typically trial courts prefer not to begin trials on Fridays, so each Friday can be stricken from the listing of potentially assignable report dates. Next, the court will exclude legal holidays from the listing of potentially assignable report dates since there will be no court sessions held on legal holidays.

After the court has a listing of the potentially assignable report dates, it establishes rules for setting a number of prospective jurors who will be summoned to report on each such date. Typically, courts prefer to begin a particular trial on a Monday. So, generally a court will summon a greater number of prospective jurors to report to court on a Monday than the number of prospective jurors who will be summoned to report on any other day of the week. In general, each court will determine, based upon past experience, the number of prospective jurors (or quota) who will be summoned to report on each of the potentially assignable report dates.

System 1000 will make use of previously established rules for each specific trial court for determining the listing of potentially assignable report dates and the number of prospective jurors who will be summoned to report on each such report date. System 1000 may then make use of a random selection process to assign a subset of the plurality of qualified prospective jurors from among the set of all qualified prospective jurors to each such report date until the quota for the report date is met. Each court also has its own rules as to the amount of time in advance of a particular report date in which to assign and summon prospective jurors for such report date. For example, the Superior Court for the District of Columbia sends out 3,000 to 4,000 juror summonses each week for report dates 30 to 60 days in advance of the report date. If the system 1000 is not currently able to assign a report date for which the qualified prospective juror must report for jury service (e.g., the quotas for each report date for the next 60 days have already been met), then, at step 63, system 1000 will notify the qualified prospective juror of that fact and will inform the qualified prospective juror that he/she will be notified of a report date at some time in the future via email or U.S. mail and the qualified prospective juror may exit from system 1000.

If, in step 62 a report date can be assigned for the qualified prospective juror, then, in step 64, a report date for reporting to the courthouse is assigned to the qualified prospective juror. Then, at step 65, the qualified prospective juror receives a summons for jury service (whether receipt is via U.S. mail or via email) indicating a report date and time for the qualified prospective juror to report to the courthouse for jury service.

Following receipt by the qualified prospective juror of the summons, the qualified prospective juror may again access the secure portion of system 1000 via connection to the Internet using the log-in steps described above. At step 70, the system 1000 queries the qualified prospective juror as to whether the prospective juror will accept the assigned report date, request a deferral of the assigned report date or seek a complete exemption from the jury service.

Possible reasons for granting of complete exemptions or excuses from jury service vary by court, but some typical reasons for complete exemptions include: (a) the qualified prospective juror is 70 years of age or older and does not wish to serve; (b) the qualified prospective juror has legal custody of, and is necessarily and personally responsible for, a child or children 16 years of age or under requiring continuous care during normal court hours; (c) the qualified prospective juror is necessarily and personally responsible for a person having a physical or mental impairment requiring continuous care during normal court hours; (d) the qualified prospective juror is on active duty in a branch of the armed forces of the United States; or (e) the qualified prospective juror is a sworn law enforcement, correctional or jail officer. Each court exercises its own discretion regarding whether or not to grant a qualified prospective juror a complete exemption from jury service.

If the qualified prospective juror responds to the query at step 70 that he/she wishes to seek a complete exemption, then, at step 75, the system 1000 will serve a web page display to the qualified prospective juror's computer which web page display is of a Request for Exemption form for the qualified prospective juror to complete to seek such an exemption. Since many courts require requests for exemption to be executed or signed by the qualified prospective juror under penalty of perjury, the qualified prospective juror may print out a paper copy of the Request for Exemption form, complete it and sign it, and mail back the paper copy of the completed, signed Request for Exemption form to the court. However, if a court accepts a digital signature as evidence of the qualified prospective juror's execution of the Request for Exemption form, then the qualified prospective juror may complete the form on-line, affix a digital signature thereto and transmit the completed, executed Request for Exemption form back to the court via email transmission to system 1000.

At step 80, the system 1000 will compare the reason given for the request for exemption in the transmitted, completed, executed Request for Exemption form to a master court listing of acceptable reasons for grant of an exemption from jury service. If the reason given in the transmitted, completed, executed Request for Exemption form matches with one of the acceptable reasons in the master court listing, at step 85, the system 1000 will transmit an acceptance notification to the qualified prospective juror via the Internet and will also transmit a status update to the database 20 of the system 1000 to update the information stored in database 20 concerning the qualified prospective juror and will also transmit the status update to the court's database 7 for the court to update its information concerning the prospective juror and to determine whether or not to retain the prospective juror's name in the master jury wheel 10. If the reason given for the request for exemption does not match with one of the acceptable reasons for grant of a complete exemption included in the master court listing, however, then, at step 90, system 1000 will transmit via email to the qualified prospective juror a denial notification informing the qualified prospective juror that the request for exemption is denied, giving the reason for the denial, and informing the qualified prospective juror that he/she continues to be obligated to report to court for jury service on the original report date and time given in the jury summons.

If the qualified prospective juror wishes to obtain a deferral of the report date for his/her jury service rather than requesting a complete exemption in step 70, then, at step 95, system 1000 serves a web page to the qualified prospective juror's computer which web page displays a Request for Deferral form. A deferral is different from a complete exemption from jury service in that the qualified prospective juror is not seeking to be completely relieved from the jury service, but rather the particular report date on which the qualified prospective juror is scheduled to report to court is inconvenient for the qualified prospective juror and another date would be acceptable. For example, a qualified prospective juror may be out of town on the scheduled report date, but he/she would be capable of serving as a juror on some other date.

The qualified prospective juror may electronically transmit the completed Request for Deferral form to system 1000. In step 100, system 1000 will compare the reason given for the request for deferral in the transmitted, completed, executed Request for Deferral form to a master listing of acceptable reasons for deferral stored in a database of system 1000. If there is a match, then, at step 105, an alternate report date for jury service is assigned and is then transmitted electronically to the qualified prospective juror's computer. Typically, trial courts are more lenient in approving requests for deferrals than requests for exemptions. If there is not a match at step 100, then at step 110 the system 1000 will electronically transmit to the qualified prospective juror a denial notification informing the qualified prospective juror that the request for deferral was denied and indicating the reason for the denial and that the qualified prospective juror remains obligated to report to the courthouse on the original report date.

The next step, step 115, occurs when the qualified prospective juror reports to the courthouse on the scheduled report date (see FIG. 1C). Upon reporting to the courthouse, the qualified prospective juror will again access the system 1000 web site and will input his/her first juror identification number and social security number. At step 120, the system 1000 compares the inputted first juror identification number and social security number to the stored first juror identification number and social security number for such qualified prospective juror contained in the database 20 to confirm that the inputted numbers match the stored numbers. If either of the two sets do not match, then, at step 120, system 1000 will display an error message to the qualified prospective juror and will prompt the qualified prospective juror to try inputting the two numbers again or to exit from system 1000. If the numbers were input correctly in step 115, then, in step 130, the system 1000 transmits status information to database 20 and court database 7 to update the data stored in the database 20 and court database 7 concerning the status of the qualified prospective juror to indicate that the qualified prospective juror reported to the courthouse on the scheduled report date. The system 1000 will also output a second juror identification number for use by the qualified prospective juror in subsequent steps in the jury voir dire process. The second juror identification number provides added system security because, if the qualified prospective juror fails to report to the courthouse on the scheduled report date, then the qualified prospective juror will not obtain the second juror identification number and cannot complete subsequent steps in the jury voir dire process.

In step 135, the qualified prospective juror inputs the second juror identification number in response to a query from system 1000. In response to the inputted second juror identification number, the system 1000 will serve a web page display for a Juror Suitability Test to the qualified prospective juror's computer. The displayed Juror Suitability Test includes preliminary juror voir dire questions which are designed for screening qualified prospective jurors to determine how the qualified prospective juror's own personal life experiences and beliefs affect his/her "suitability" to sit as a juror in a trial on a specific type of legal action. For example, if the qualified prospective juror has been arrested, but acquitted of a crime, the qualified prospective juror may not be suitable to sit as a juror on a criminal trial, but may be an appropriate or suitable juror for a breach of contract action. Similarly, if the qualified prospective juror was a victim of a hit-and-run motor vehicle incident, the qualified prospective juror may not be suitable to sit as a juror in a motor vehicle incident case, but may be perfectly well-suited to sit as a juror in a criminal case.

This step 135 of conducting preliminary juror voir dire questions for suitability on-line will save trial courts much time and resources. According to a recent study conducted and published by the Federal Judicial Center entitled "Conduct of the Voir Dire Exam: Practices and Opinions of Federal District Judges," federal judges reported spending, on average, 45 minutes per case to conduct oral voir dire of qualified prospective jurors in the courtroom and many judges reported spending up to 2 hours per case on such oral courtroom voir dire. If qualified prospective jurors may answer preliminary voir dire questions for suitability on-line prior to reporting to a trial courtroom to ensure that only those qualified prospective jurors answering the preliminary voir dire questions in a manner indicating their initial suitability to sit as jurors on a particular case are assigned to the particular case, judges can streamline any remaining oral voir dire questions conducted in the trial courtroom and the case may proceed more quickly to the substantive aspects of the trial, resulting in a savings of the court's time and resources. In step 140, system 1000 then compares the qualified prospective juror's answers to the preliminary voir dire questions to answers in process control database 58 and assigns the qualified prospective juror to a category grouping of the type of trial for which the qualified prospective juror is suitable to sit as a juror, e.g., all criminal trials, burglary trials only, assault trials, etc. The category group assignment data for such qualified prospective juror is then stored in a database 150 to assist the court in determining a specific trial to which the qualified prospective juror may be assigned. The jury voir dire process of the present invention concludes following step 140.

It will be apparent to those skilled in the art that various modifications and variations can be made in the method and system of the present invention without departing from the scope or spirit of the invention. Thus, it is intended that the present invention cover the modifications and variations of this invention provided they come within the scope of the appended claims and their equivalents.

What is claimed is:

1. An automated process for conducting jury voir dire for a trial court comprising the steps of:
   a. forming a master database of names of citizens eligible to serve as jurors from a set of all citizens residing within the trial court's jurisdiction, said master database being stored in a computer system of said trial court;
   b. forming a master jury wheel from the master database by using a random selection procedure to select a smaller set of names of citizens, said smaller set of names of citizens representative of a fair demographic cross section of the set of all citizens residing within the trial court's jurisdiction, said master jury wheel being stored in said computer system of said trial court;

c. randomly selecting a plurality of prospective jurors from the plurality of names of citizens from the master jury wheel and storing data in a database for a jury voir dire system relating to a name, a social security number, a first juror identification number and a court identification number for each one of the plurality of prospective jurors;

d. transmitting an initial notification of a potential jury service to each one of the plurality of prospective jurors, wherein for each one of said plurality of prospective jurors said initial notification includes said first juror identification number, the court identification number and a predetermined URL address identifying a location of a host server for accessing a jury voir dire system via a browser of a computer used by one of said plurality of prospective jurors;

e. transmitting a first access request, said first juror identification number, the court identification number and a social security number for said one prospective juror from the computer of the one prospective juror over a general purpose computer network to the host server;

f. comparing a first pair of numbers including the transmitted first juror identification number to said stored first juror identification number for said one prospective juror in said second database to determine whether said transmitted first juror identification number matches said stored first juror identification number and comparing a second pair of numbers including said transmitted social security number to said stored social security number for said one prospective juror in said second database to determine whether said transmitted social security number matches said stored social security number;

g. granting access to a secure portion of said jury voir dire system if said first pair of numbers is a match and said second pair of numbers is a match;

h. serving a web page to said computer for said one prospective juror representing a juror questionnaire form, said juror questionnaire form having a plurality of questions designed to determine whether said one prospective juror is qualified to sit as a juror;

i. completing said juror questionnaire by accepting responses to each of said plurality of questions and transmitting the completed juror questionnaire form from said computer of said prospective juror over said general purpose computer network to said host server;

j. comparing the responses for each of said plurality of questions on said transmitted, completed juror questionnaire form to a stored standard set of responses for each of said plurality of questions, said stored standard set of responses representative of responses for a qualified juror;

k. updating the data stored in said first database and said second database relating to each one of said prospective jurors indicating whether said one of said prospective jurors is qualified based on the results of the comparing step;

l. transmitting a summons for jury service to each one of said plurality of prospective jurors that is qualified, said summons including an assigned report date for said qualified prospective juror to report to the trial court for jury service;

m. querying said qualified prospective juror, in response to an inputted second access request and said first juror identification number from said computer of said qualified prospective juror over said general purpose computer network to said host server, whether said qualified prospective juror will accept the assigned report date, request a deferral of the assigned report date or request an exemption from the jury service;

n. serving a Request for Deferral form to the computer of said qualified prospective juror from the host server over said general purpose computer network in response to a request for deferral response to said query from said qualified prospective juror, or serving a Request for Exemption form to the computer of said qualified prospective juror from the host server over said general purpose computer network in response to a request for exemption response to said query from said qualified prospective juror;

o. completing and transmitting the completed Request for Deferral form from the computer of said qualified prospective juror over said general purpose computer network to said host server in response to a served Request for Deferral form, said completed, transmitted Request for Deferral form including a reason given by said qualified prospective juror for requesting the deferral of the report date;

p. completing and transmitting the completed Request for Exemption form from the computer of said qualified prospective juror over said general purpose computer network to said host server in response to a served Request for Exemption form, said completed, transmitted Request for Exemption form including a reason given by said qualified prospective juror for requesting said exemption from jury service;

q. comparing the completed, transmitted Request for Deferral form and the given reason for requesting the deferral to a plurality of predetermined acceptable reasons for deferral of the report date and, if said given reason matches with one of the plurality of predetermined acceptable reasons, transmitting a first approval notification to said computer of said qualified prospective juror over said general purpose computer network from said host server, said first approval notification informing said qualified prospective juror that the request for deferral was approved and that a new report date will be assigned;

r. comparing the completed, transmitted Request for Exemption form and the given reason for requesting the exemption to a plurality of predetermined acceptable reasons for exemption from jury service and, if said given reason matches with one of the plurality of acceptable reasons for exemption, transmitting a second approval notification to said computer of said qualified prospective juror over said general purpose computer network from said host server, said second approval notification informing said qualified prospective juror that the request for exemption was approved and that said qualified prospective juror is exempted from jury service;

s. updating the data stored in said first database and said second database relating to each one of said qualified prospective jurors with data indicative of the response of said one qualified prospective juror to said query of the querying step and with data indicative of whether a request for deferral or a request for exemption was approved;

t. transmitting a second assigned report date from said host server to said computer of said qualified prospective juror over said general purpose computer network if a request for deferral was approved for said qualified prospective juror;

u. transmitting on the report date a second access request and said first juror identification number and said social security number for said qualified prospective juror from the computer of said qualified prospective juror over said general purpose computer network to said host server;

v. repeating the comparing step and the granting access steps;

w. outputting, in response to the second access request following the granting access step, a second juror identification number for said qualified prospective juror to the computer of the qualified prospective juror;

x. updating the data stored in said first database and said second database relating to said qualified prospective juror indicating that said qualified prospective juror reported to the court on the assigned report date;

y. serving a Juror Suitability Test form to the computer of said qualified prospective juror from the host server over said general purpose computer network, said Juror Suitability Test form including a plurality of questions designed to determine at least one of a plurality of trial types for which said qualified prospective juror is suitable to sit as a juror;

z. completing said Juror Suitability Test form by accepting responses to each of said plurality of questions and transmitting the completed Juror Suitability Test form from the computer of said qualified prospective juror to said host server over said general purpose computer network; and aa. comparing the responses for each of said plurality of questions on said transmitted, completed Juror Suitability Test form to a stored standard set of responses for each of said plurality of questions and assigning a group category to said qualified prospective juror, said assigned group category indicative of at least one of a plurality of trial types for which said qualified prospective juror is suitable to sit as a juror.

2. The automated process for conducting jury voir dire for a trial court as claimed in claim 1 further comprising the steps of:

bb. exiting from said jury voir dire system following said comparing the responses step if the responses for one of said plurality of questions on said transmitted, completed juror questionnaire form does not match the response to said one of said plurality of questions in said stored standard set of responses; and cc. updating the data stored in said first database and said second database relating to said one prospective juror indicating that said one prospective juror is not qualified.

3. The automated process for conducting jury voir dire for a trial court as claimed in claim 1 further comprising the steps of:

bb. exiting from said jury voir dire system following said comparing the completed, transmitted Request for Exemption form step if the given reason for requesting the exemption matches with one of said acceptable reasons for exemption from jury service; and cc. updating the data stored in said first database and said second database relating to said one prospective juror indicating that said one prospective juror was exempted from jury service.

4. The automated process for conducting jury voir dire for a trial court as claimed in claim 1 wherein the master database is compiled from a listing of registered voters.

5. The automated process for conducting jury voir dire for a trial court as claimed in claim 1 wherein the master database is compiled from a listing of persons holding driver's licenses.

6. The automated process for conducting jury voir dire for a trial court as claimed in claim 1 wherein the master database is compiled from a listing of persons filing tax returns.

7. The automated process for conducting jury voir dire for a trial court as claimed in claim 1 wherein the master database is compiled from one or more listings from a plurality of listings including a listing of registered voters, a listing of persons holding driver's licenses, and a listing of persons filing tax returns.

8. The automated process for conducting jury voir dire for a trial court as claimed in claim 1 wherein the master database is compiled from one or more listings from a plurality of listings including a listing of registered voters, a listing of persons holding driver's licenses, and a listing of persons filing tax returns.

9. The automated process for conducting jury voir dire for a trial court as claimed in claim 1 further comprising the steps of:

bb. transmitting a denial notification to said computer of said qualified prospective juror over said general purpose computer network from said host server following said comparing the completed, transmitted Request for Deferral form step if the given reason for requesting the deferral does not match with at least one of the plurality of predetermined acceptable reasons; and cc. informing the qualified prospective juror to report to court on the report date.

10. The automated process for conducting jury voir dire for a trial court as claimed in claim 1 further comprising the step of:

bb. transmitting a denial notification to said computer of said qualified prospective juror over said general purpose computer network from said host server following said comparing the completed, transmitted Request for Exemption form step if the given reason for requesting the exemption does not match with at least one of the plurality of acceptable reasons for exemption.

11. An automated process for conducting jury voir dire for a trial court comprising the steps of:

a. forming a master database of names of citizens eligible to serve as jurors from a set of all citizens residing within the trial court's jurisdiction, said master database being stored in a computer system of said trial court;

b. forming a master jury wheel from the master database by using a random selection procedure to select a smaller set of names of citizens, said smaller set of names of citizens representative of a fair demographic cross section of the set of all citizens residing within the trial court's jurisdiction, said master jury wheel being stored in said computer system of said trial court;

c. randomly selecting a plurality of prospective jurors from the plurality of names of citizens from the master jury wheel and storing data in a database for a jury voir dire system relating to a name, a social security number, a first juror identification number and a court identification number for each one of the plurality of prospective jurors;

d. transmitting an initial notification of a potential jury service to each one of the plurality of prospective jurors, wherein for each one of said plurality of prospective jurors said initial notification includes said first juror identification number, the court identification number and a predetermined URL address identifying a location of a host server for accessing a jury voir dire system via a browser of a computer used by one of said plurality of prospective jurors;

e. transmitting a first access request, said first juror identification number, the court identification number and a social security number for said one prospective juror from the computer of the one prospective juror over a general purpose computer network to the host server;

f. comparing a first pair of numbers including the transmitted first juror identification number to said stored first juror identification number for said one prospective juror in said second database to determine whether said transmitted first juror identification number matches said stored first juror identification number and comparing a second pair of numbers including said transmitted social security number to said stored social security number for said one prospective juror in said second database to determine whether said transmitted social security number matches said stored social security number;

g. granting access to a secure portion of said jury voir dire system if said first pair of numbers is a match and said second pair of numbers is a match;

h. serving a web page to said computer for said one prospective juror representing a juror questionnaire form, said juror questionnaire form having a plurality of questions designed to determine whether said one prospective juror is qualified to sit as a juror;

i. completing said juror questionnaire by accepting responses to each of said plurality of questions and transmitting the completed juror questionnaire form from said computer of said prospective juror over said general purpose computer network to said host server;

j. comparing the responses for each of said plurality of questions on said transmitted, completed juror questionnaire form to a stored standard set of responses for each of said plurality of questions, said stored standard set of responses representative of responses for a qualified juror;

k. updating the data stored in said first database and said second database relating to each one of said prospective jurors indicating whether said one of said prospective jurors is qualified based on the results of the comparing step;

l. transmitting a summons for jury service to each one of said plurality of prospective jurors that is qualified, said summons including an assigned report date for said qualified prospective juror to report to the trial court for jury service;

m. querying said qualified prospective juror, in response to an inputted second access request and said first juror identification number from said computer of said qualified prospective juror over said general purpose computer network to said host server, whether said qualified prospective juror will accept the assigned report date, request a deferral of the assigned report date or request an exemption from the jury service;

n. serving a Request for Deferral form to the computer of said qualified prospective juror from the host server over said general purpose computer network in response to a request for deferral response to said query from said qualified prospective juror, or serving a Request for Exemption form to the computer of said qualified prospective juror from the host server over said general purpose computer network in response to a request for exemption response to said query from said qualified prospective juror;

o. completing and transmitting the completed Request for Deferral form from the computer of said qualified prospective juror over said general purpose computer network to said host server in response to a served Request for Deferral form, said completed, transmitted Request for Deferral form including a reason given by said qualified prospective juror for requesting the deferral of the report date;

p. completing and transmitting the completed Request for Exemption form from the computer of said qualified prospective juror over said general purpose computer network to said host server in response to a served Request for Exemption form, said completed, transmitted Request for Exemption form including a reason given by said qualified prospective juror for requesting said exemption from jury service;

q. comparing the completed, transmitted Request for Deferral form and the given reason for requesting the deferral to a plurality of predetermined acceptable reasons for deferral of the report date and, if said given reason matches with one of the plurality of predetermined acceptable reasons, transmitting a first approval notification to said computer of said qualified prospective juror over said general purpose computer network from said host server, said first approval notification informing said qualified prospective juror that the request for deferral was approved and that a new report date will be assigned;

r. comparing the completed, transmitted Request for Exemption form and the given reason for requesting the exemption to a plurality of predetermined acceptable reasons for exemption from jury service and, if said given reason matches with one of the plurality of acceptable reasons for exemption, transmitting a second approval notification to said computer of said qualified prospective juror over said general purpose computer network from said host server, said second approval notification informing said qualified prospective juror that the request for exemption was approved and that said qualified prospective juror is exempted from jury service;

s. updating the data stored in said first database and said second database relating to each one of said qualified prospective jurors with data indicative of the response of said one qualified prospective juror to said query of the querying step and with data indicative of whether a request for deferral or a request for exemption was approved;

t. transmitting a second assigned report date from said host server to said computer of said qualified prospective juror over said general purpose computer network if a request for deferral was approved for said qualified prospective juror;

u. transmitting on the report date a second access request and said first juror identification number and said social security number for said qualified prospective juror from the computer of said qualified prospective juror over said general purpose computer network to said host server;

v. repeating the comparing step and the granting access steps;

w. outputting, in response to the second access request following the granting access step, a second juror identification number for said qualified prospective juror to the computer of the qualified prospective juror;

x. updating the data stored in said first database and said second database relating to said qualified prospective juror indicating that said qualified prospective juror reported to the court on the assigned report date;

y. serving a Juror Suitability Test form to the computer of said qualified prospective juror from the host server over said general purpose computer network, said Juror Suitability Test form including a plurality of questions designed to determine at least one of a plurality of trial types for which said qualified prospective juror is not suitable to sit as a juror;

z. completing said Juror Suitability Test form by accepting responses to each of said plurality of questions and transmitting the completed Juror Suitability Test form from the computer of said qualified prospective juror to said host server over said general purpose computer network; and aa. comparing the responses for each of said plurality of questions on said transmitted, completed Juror Suitability Test form to a stored standard set of responses for each of said plurality of questions and assigning a group category to said qualified prospective juror, said assigned group category indicative of at least one of a plurality of trial types for which said qualified prospective juror is not suitable to sit as a juror.

* * * * *

UNITED STATES PATENT AND TRADEMARK OFFICE
CERTIFICATE OF CORRECTION

PATENT NO. : 6,640,213 B1  Page 1 of 1
DATED : October 28, 2003
INVENTOR(S) : Tenley Anne Carp et al.

It is certified that error appears in the above-identified patent and that said Letters Patent is hereby corrected as shown below:

Column 16,
Lines 18-23, should read:
8. The automated process for conducting jury voir dire for a trial court as claimed in claim 1 futher comprising the step of:
    bb. re-transmitting said first access request, said first juror identification number, said court identification number and said social security number for said one prospective juror following said comparing of numbers step if said first pair of numbers is not a match or said second pair of numbers is not a match.

Signed and Sealed this

Twenty-seventh Day of April, 2004

JON W. DUDAS
*Acting Director of the United States Patent and Trademark Office*